United States Patent [19]

Utsunomiya et al.

[11] Patent Number: 4,674,622
[45] Date of Patent: Jun. 23, 1987

[54] CONVEYOR BELT

[75] Inventors: Tadashi Utsunomiya, Yokohama; Yasuhiko Matsumuro, Tokyo; Keishi Sato, Yokohama; Yoshihide Fukahori, Hachiohji; Masao Ogawa, Kawagoe, all of Japan

[73] Assignee: Bridgestone Corporation, Tokyo, Japan

[21] Appl. No.: 765,537

[22] Filed: Aug. 14, 1985

[51] Int. Cl.⁴ .............................................. C08K 5/10
[52] U.S. Cl. .................................... 198/500; 198/847
[58] Field of Search ........................ 198/500, 847, 846

[56] References Cited

U.S. PATENT DOCUMENTS

| | | | |
|---|---|---|---|
| 4,184,589 | 1/1980 | Habegger | 198/847 |
| 4,411,947 | 10/1983 | Heynhold | 198/847 |
| 4,500,666 | 2/1985 | Wada | 198/500 |
| 4,517,332 | 5/1985 | Wada | 198/500 |
| 4,572,359 | 2/1986 | Fujita et al. | 198/847 |

FOREIGN PATENT DOCUMENTS

| | | | |
|---|---|---|---|
| 59-78004 | 5/1984 | Japan | 198/846 |
| 59-113043 | 6/1984 | Japan | 198/846 |
| 685574 | 9/1979 | U.S.S.R. | 198/847 |

Primary Examiner—Frank E. Werner
Assistant Examiner—Lyle Kimms
Attorney, Agent, or Firm—Birch, Stewart, Kolasch & Birch

[57] ABSTRACT

A conveyor belt having a cover layer is disclosed and a core layer. An adhesion-proofing agent is contained in the cover layer. The conveyor belt further has a migration-proofing layer provided between the cover layer and the core layer for preventing migration of the adhesion-proofing agent in the cover layer to the core layer.

28 Claims, 10 Drawing Figures

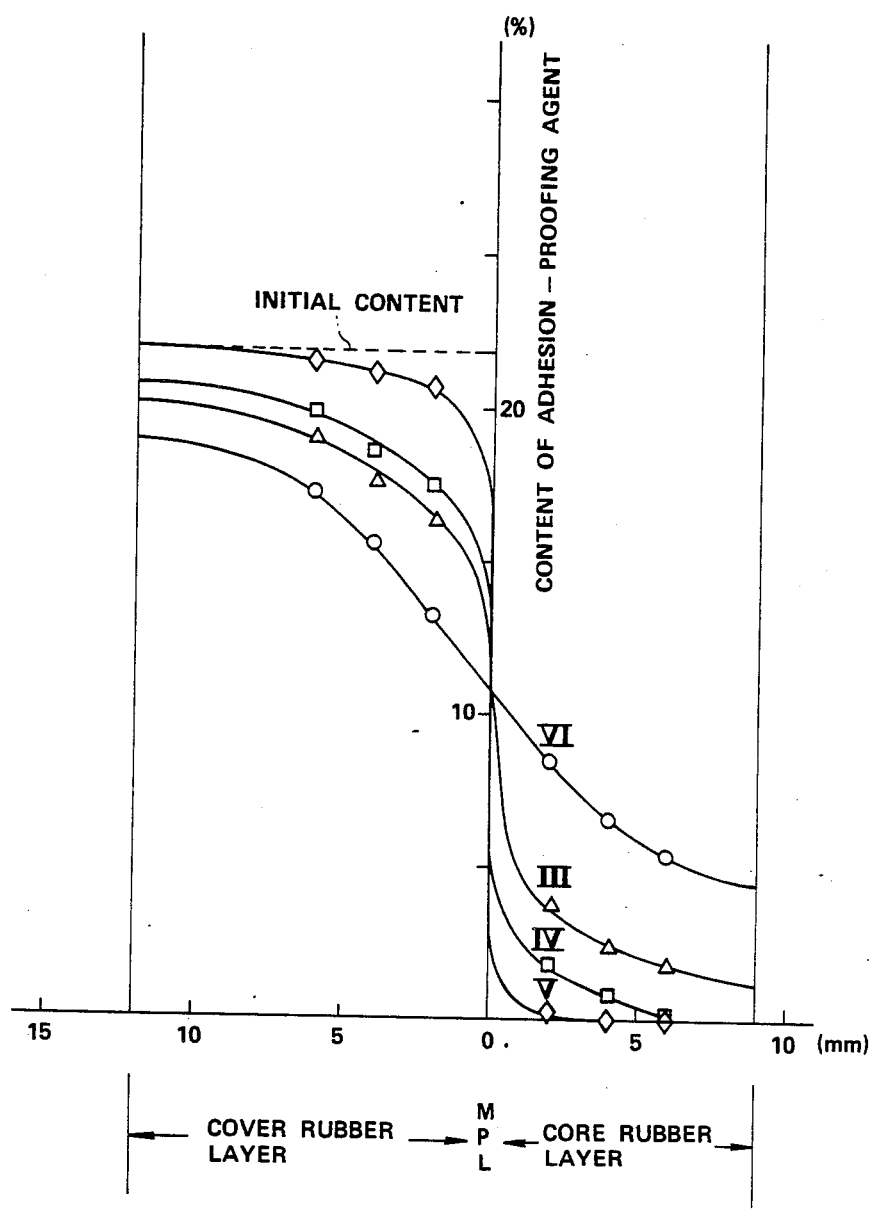

4,674,622

CONVEYOR BELT

BACKGROUND OF THE INVENTION

The present invention relates to a conveyor belt for carrying tacky materials such as oil sand, and more particularly a conveyor belt wherein adhesion of the tacky materials can be effectively prevented.

Oil sand, containing as its principal constituent quartz sand, is a clay-like material containing a large amount of a tar material or bitumen out of which synthetic crude oil is produced. In general, conveyance of oil sand by a conveyor belt has faced problems of adhesion of oil sand to the conveyor belt, and in the prior art conveyor belt, oil sand easily adheres thereto to form an undesired thick layer, and it has been desired to overcome this defect.

In order to cope with this difficulty, before oil sand is placed on such a conveyor belt, kerosene and antifreezing solution or a surface active agent is applied onto the conveyor belt so as to prevent adhesion of oil sand to the conveyor belt and formation of a thick layer thereon. However, these methods have caused a rise in cost of conveyance due to additional installation costs and material costs, and usage of kerosene or the like will disadvantageously increase the danger of fire. Under these circumstances, there has been a strong desire to develop a conveyor belt which requires no such application of adhesion-proofing agents such as kerosene but is free from adhesion of oil sand.

SUMMARY OF THE INVENTION

Therefore, it is an object of the present invention to overcome the above difficulties by providing a conveyor belt suitable for conveyance of tacky materials such as oil sand.

Another object of the present invention is to provide a conveyor belt which can reduce adhesion of tacky materials such as oil sand as much as possible.

A further object of the present invention is to provide a conveyor belt in which influences on a core layer as to bond strength and physical properties can be prevented.

According to the present invention, in order to attain the above objects, there is provided a conveyor belt comprising a cover layer having at least one layer in which an adhesion-proofing agent is contained, a core layer and a migration-proofing layer interposed between the cover layer and the core layer for preventing migration of the adhesion-proofing agent to the core layer.

With this construction, the migration-proofing layer interposed between the core layer and the cover layer is useful to prevent migration of the adhesion-proofing agent contained in the cover layer into the core layer which would cause reduction of the amount of the adhesion-proofing agent in a cover layer. As the result, the adhesion-proofing agent can be kept in the cover layer in a satisfactorily stable state to retain a remarkable effect, preventing adhesion of tacky materials such as oil sand to the cover layer which forms the surface of the conveyor belt.

Thus, the conveyor belt according to the present invention is composed of a cover layer having at least one layer in which an adhesion-proofing agent is contained, a core layer and a migration-proofing layer for preventing migration of the adhesion-proofing agent to the core layer, and though it requires no such application of specific adhesion-proofing liquids such as kerosene at each service, the conveyor belt is free from adhesion of tacky materials such as oil sand, resulting in reduction of conveying cost, no fear of fire, facilitation of maintenance and others.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 shows another graph illustrating the degree of migration of the adhesion-proofing agent to the core layer.

DETAILED DESCRIPTION OF THE PREFERRED EMBODIMENTS

Figure 1:
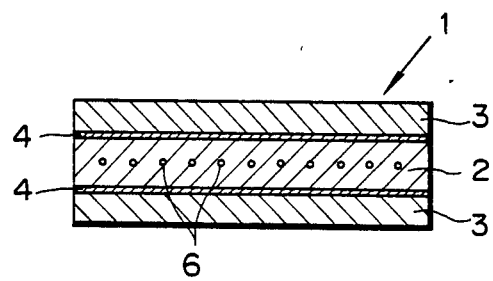
FIG. 1 is a cross-sectional view of a conveyor belt according to an embodiment of the present invention.
Figure 2:
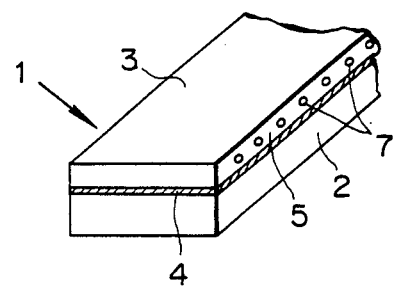
FIG. 2 is a fragmentary perspective view of the conveyor belt according to another embodiment of the present invention.
Figure 3:
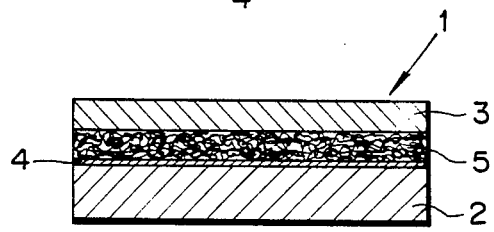
FIG. 3 is a cross-sectional view of the conveyor belt according to a further embodiment of the present invention.

Referring now to FIGS. 1 to 3 in which preferred embodiments of the present invention are shown, a conveyor belt 1 is composed of a core layer 2, a cover layer 3 on either surface in which an adhesion-proofing agent is contained and a migration-proofing layer 4 interposed between the core layer 2 and the cover layer 3. In FIG. 1, the migration-proofing layer 4 is directly disposed between the core layer 2 and the cover layer 3, while in the conveyor belt 1 shown in FIG. 2 or 3, there is formed a layer 5 containing a high level of an adhesion-proofing agent under the cover layer 3 and the migration-proofing layer 4 is disposed between the layer 5 and the core layer 2, that is, it is disposed through the layer 5 between the cover layer 3 and the core layer 2.

Though the conveyor belt 1 shown in FIGS. 1, 2 and 3 has on either surface thereof the cover layer 3 consisting of a single layer, the cover layer 3 may be a lamination having a plurality of layers, if required.

Preferably, the core layer 2 may be made of rubber with reinforcing material 6 embedded therein. The rubber is not particularly limited, but preferably it may be natural rubber (NR), isoprene rubber (IR), styrene-butadiene rubber (SBR), polybutadiene rubber (BR), polyisobutylene rubber, polychloroprene rubber (CR), butyl rubber (IIR), acrylonitrile-butadiene rubber (NBR), epoxidized natural rubber or others or blends thereof. The reinforcing material 6 may be metal cords such as steel cord the surface of which may be plated with brass, bronze zinc, etc. and other metal cords, or plastic canvas or cords made of nylon, rayon, polyvinyl alcohol, polyester, aromatic polyamide, cotton and others.

The cover layer 3 is made of rubber or a plastic material in which an adhesion-proofing agent is contained.

The kinds of the rubber or plastic materials are not particularly limited, provided that they can be mixed with adhesion-proofing agents and have, after being molded, enough flexibility to be used as a belt. For example, the rubber may be natural rubber or synthetic rubbers. The synthetic rubbers may be polybutadiene rubber (BR), polyisoprene rubber (IR), styrene-butadiene rubber (SBR), butyl rubber (IIR), halogenated butyl rubber, polychloroprene rubber (CR), epichlorohydrin rubber, acrylic rubber, silicone rubber, silicone-ethylene-propyrene rubber, chlorosulfonic polyethylene, ethylene-vinyl acetate copolymers (EVA), chlorinated polyethylene, ethylene propylene rubber (EPT), ethylene-propylenediene rubber (EPDM), acrylonitrile-butadiene rubber (NBR), polyurethane elastomer and others. These materials may be used solely, or two or more of them may be combined. In this case, rubbers having a relatively high polarity, such as acrylonitrile-butadiene rubber (NBR), polyurethane elastomer and acrylic rubber are preferably used to obtain the desired anti-adhesive property to tacky materials such as oil sand. Furthermore, resistance to low temperature canced be advantageously improved by using mixture of the rubbers having a relatively high polarity such as acrylonitrile-butadiene rubber, polyurethane elastomer and acrylic rubber, with another rubber such as polybutadiene rubber (BR), styrene butadiene rubber (SBR) and natural rubber (NR).

The plastic materials of the cover layer 3 may be thermoplastic materials such as methacrylic resin, ABS resin, polyvinyl chloride, polystyrene, polyvinylidene chloride, polyamide, cellulosic resin, polyethylene, polypropylene, modified polyolefin, chlorinated polyolefin, ethylene-vinyl acetate copolymer, ethylene acrylate copolymer, and the like.

Now, the description will be directed to adhesion-proofing agents to be contained in the above rubber or plastic material.

According to the conventional conception of adhesion or bonding, in order to obtain a solid surface of low adhesive or bonding property, it is necessary to reduce as far as possible the interfacial tension or critical surface energy (Yc) of the solid body. For example, because of their small Yc, some plastic materials such as polytetrafluoroethylene are well known to be applied to the surface of a metal mold or kitchen utensils to present a coating which effectively peels off adhered materials. However, bitumen is, as is well known, a tar material having so strong an adhesive property as to be used as adhesives [O. K. Dobozy & M. Simon: Surface, 10, 529 (1972)], and even the materials having low critical surface energy such as polytetrafluoroethylene and ceramic will adhere to bitumen as strongly as other materials with little differences, when they contact with bitumen. As a result, the prior art method of reducing the critical surface energy Yc is almost of no use to obtain a conveyor belt having little adhesive or bonding property with respect to oil sand.

However, the present inventors inventors have changed the conventional conception as to preventing adhesion of tacky material, and after our research, we found the following adhesion-proofing agents to be suitable.

For effective use, such adhesion-proofing agents are desired to have a property that, before molding, they can be compounded in rubber or plastic materials and, after molding, bled constantly on the surface of the belt, and it is preferable that the surface of the belt is constantly covered with a layer of such an adhesion-proofing agent.

As mentioned above, the prior art method of preventing adhesion of tacky materials takes the position of reducing Yc of the object solid surface as far as possible and making the contact area between the tacky material and the solid as small as possible. On the contrary, in the present invention, an adhesion-proofing agent greatly compatible with bitumen is effectively used, and as soon as the adhesion-proofing agent bled on the surface of the belt comes in contact with bitumen or oil sand, it is preferably quite satisfactorily wetted to form a mixed phase.

Furthermore, the effective adhesion-proofing agent of the present invention reduces its bonding or cohensive strength dramatically when it is mixed with bitumen. Therefore, the mixed phase of bitumen and the adhesion-proofing agent has the cohensive force drastically smaller than that of bitumen itself, and as a result, oil sand once adhered to the belt will be easily peeled off from the surface of the belt owing to external forces such as empty weight.

Thus, when the effective adhesion-proofing agent of the present invention is mixed with rubber or a plastic material, it will cause a surface condition of the rubber or the plastic material relatively adhesive to oil sand, and at the same time drastically reduce the bonding strength between the adhered oil sand and the surface of the rubber or plastic material, causing easy peeling of oil sand once adhered and corresponding quite low adhesion. Therefore, the adhesion-proofing agent to be used in the present invention is desired to have the following properties:

(1) The adhesion-proofing agent is to be greatly compatible with bitumen, and, considering that the SP value (solubility parameter) of bitumen is between 8 and 9, it should have an SP value between 6.5 and 10.5 and preferably between 7.0 and 10.0, and more preferably between 7.0 and 9.5.

(2) It is important for the adhesion-proofing agent after being mixed with bitumen to reduce the adhesion or cohensive force of bitumen, and a solution prepared by blending bitumen and the adhesion-proofing agent in a weight ratio of 1:1 should have, at a temperature of 25° C., the bonding strength less than 35%, and preferably less than 27%, and more preferably less than 21% of that of bitumen itself.

(3) The adhesion-proofing agent blended in the rubber or plastic material is desired to be bled effectively on the surface of the rubber or plastic material. A sheet sample containing 30 parts by weight of the adhesion-proofing agent blended into the standard compound containing 100 parts by weight of NBR and 60 parts by weight of carbon is prepared to examine the amount of the adhesion-proofing agent bled on the surface of the sample at a temperature of 20° C. for 24 hours. The amount is desired to be between 0.03 and 15 mg/cm$^2$, preferably between 0.06 and 10 mg/cm$^2$, and more preferably between 0.08 and 8 mg/cm$^2$, and further preferably between 0.12 and 6 mg/cm$^2$.

(4) The adhesion-proofing agent bled on the surface of the rubber or plastic material should not be easily volatilized from the surface, and for this purpose, the boiling point of the adhesion-proofing agent is desired to be above 200° C., and preferably above 250° C.

The adhesion-proofing agent which will meet the above required properties may be organic compounds, for example, ester groups such as those of carboxylic acid, phosphoric acid, sulfuric acid, nitric acid, carbonic acid, boric acid, sulfurous acid and silicic acid, liquid polyester groups, ether groups, liquid polyether groups and epoxy compounds. Among these, esters of organic carboxylic acids are especially preferred. The esters of organic carboxylic acids will also act as a low-temperature resistant plasticizer.

Among the organic carboxylic acid esters, esters of aliphatic carboxylic acids and aliphatic alcohols are preferably used. Among the aliphatic carboxylic acids, saturated or unsaturated monobasic carboxylic acid and dibasic carboxylic acid are preferred, and especially monobasic carboxylic acid with 10 to 30 molecules of carbon and dibasic carboxylic acid with 6 to 10 molecules of carbon are most suitable. In the concrete, monobasic carboxylic acid may be capric acid, lauric acid, myristic acid, palmitic acid, stearic acid, undecylenic acid, oleic acid, linolic acid, ricinolic acid, lauroleic acid, elaidic acid, erucic acid, linoelaidic acid, eleostearic acid, myristoleic acid, linolenic acid or others, and dibasic carboxylic acid may be adipic acid, sebacic acid, azelaic acid or others. In the case of dibasic carboxylic acid, every carboxyl group therein is desired to be esterified. Aliphatic alcohol is desired to be saturated or unsaturated monohydric alcohol, and preferably the one with 1 to 10 molecules of carbon. In the concrete, it may be ethyl alcohol, propyl alcohol, butyl alcohol, pentyl alcohol, octyl alcohol, nonyl alcohol, decyl alcohol or others. The organic carboxylic acids and/or alcohols may be modified, for example, epoxidized. Especially among these organic carboxylic acids, oleic acid esters and stearic acid esters are effective, and particularly, butyl oleate, butyl stearate, n-octyl oleate, methyl oleate, butyl stearate, epoxidized butyl stearate, etc. are most preferred. The organic carboxylic acid esters may be used solely or two or more may be mixed.

The adhesion-proofing agent may be enclosed in microcapsules. Such a capsulated adhesion-proofing agent will be gradually permeated out through the wall of the capsule, allowing control of the speed of bleeding out of the surface of the conveyor belt for longer service. In case the conveyor belt is adraded, exposed microcapsules are physically broken and the adhesion-proofing agent enclosed in the capsules is discharged to wet the surface of the conveyor belt. The microcapsule material may be gelatin, gum arabic, sodium alginate, metallic salts of polyacrylic acids, polyvinylalcohol, polyacrylamide, sodium carboxymethylcellulose, polyether, polyamide, polyurea, epoxy resins, polyurethane, polystyrene or others. The proper particle diameter of the microcapsule is on the order of several microns to 2000 microns. Microcapsulation can be performed using a conventional method, for example, a chemical method such as interfacial polymerization, and phase separation from solution.

Selection of the capsule material depends upon the material to be blended, that is, rubber or plastic material. In the case of using, for example, a rubber material in which a kneading process is included to mix raw materials, it is necessary to select a strong capsule material such as polyamide. On the other hand, in case of a material, such as polyurethane elastomer, in which only mixing of liquid raw materials and molding thereof are required, a weak capsule such as gelatin can be used.

When a rubber or plastic material mixed with one of the above adhesion-proofing agents is used as a material for making an oil sand conveyor belt, the mixing ratio of the adhesion-proofing agent is so determined as to provide the belt with the lasting non or low adhesive property. For this purpose, it is necessary to mix 1 to 250 parts by weight of the adhesion-proofing agent per 100 parts by weight of the rubber or plastic material. In the case of rubber material, it is desired to mix 2 to 250 parts by weight, preferably 5 to 200 parts by weight, and more preferably 5 to 150 parts by weight of the adhesion-proofing agent per 100 parts by weight of rubber. In the case of the plastic material, it is desired to mix 2 to 100 parts by weight, preferably 5 to 70 parts by weight and more preferably 5 to 60 parts by weight of the adhesion-proofing agent per 100 parts by weight of the plastic material.

Various compounding agents can be mixed, as required, in the cover layer and core layer. These compounding agents may be a reinforcing material or filler including carbon black, white carbon, calcium carbonate, magnesium carbonate, metallic oxides such as zinc oxide, diatomaceous earth and clay, fibers such as cotton, nylon, polyvinyl alcohol, strong rayon, aromatic polyamides and carbon fiber, fatty acids such as stearic acid, antioxidants including amine groups, amine-aldehyde compounds, amine-ketone compounds and phenol groups, stabilizers, coloring agents, lubricants, flame retardants, ultraviolet absorbents, antistatic agents, cross-linking agents or vulcanizing agents including sulfur, organic sulfur compounds and peroxides such as dicumyl peroxide, vulcanization accelerators including aldehyde-amines, dithiocarbamates, guanidines, thiurams, thiazoles and thiazolines, and others.

The conveyor belt of the present invention preferably has the outmost surface of the cover layer formed of polyurethane elastomer containing the adhesion-proofing agent so as to obtain more improved properties regarding the prevention of adhesion of oil sand. As polyurethane is a rubber having good oil resistance and cold resistance, having a large polarity and low compatibility with bitumen, it will, by itself, hardly adhere to oil sand, and mixing of the adhesion-proofing agent therein will synergistically increase the effect of preventing adhesion of oil sand. Then, even if the amount of the adhesion-proofing agent to be mixed in polyurethane elastomer is smaller than that to be mixed in other usual rubbers, the polyurethane elastomer mixture will have at least the same or more preventing effects than other usual rubber mixtures. Or if the amount of the adhesion-proofing agent to be mixed in polyurethane elastomer is the same as that in usual rubbers, the polyurethane elastomer mixture retains the preventing effects on adhesion of oil sand longer.

As mentioned above, the conveyor belt of the present invention has the migration-proofing layer 4 interposed between the core layer 2 and the cover layer 3, which serves to prevent migration of the adhesion-proofing agent in the cover layer 3 to the core layer 2 to ensure the effect of the adhesion-proofing agent.

The migration-proofing layer 4 is preferably formed of a fiber layer, plastic layer, rubber layer or the combination of these layers. The fiber layer may be closely woven or knitted fabric or canvas of nylon, polyvinyl alcohol, rayon, polyester, polypropylene, cotton, aromatic polyamides, carbon fiber or the like, and preferably has a thickness of 0.2 to 5 mm. The plastic layer may be made of a thermoplastic material such as polyethylene, modified polyethylene, polyvinylchloride, polypropylene, polyacetal, polycarbonate, polyvinylalcohol, polyphenyleneoxide, polyphenylenesulfide, polysulfone, polyether sulfide, polyether sulfone, polyester, fluoro resin, polymethylpentene, polyacrylate, or thermosetting materials such as phenol resin, urea resin, melamine resin, polyester diallyl phthalate resin, xylene resin, poly-p-xylene resin, epoxy resin, alkyl benzene resin, epoxy acrylate resin, silicone resin, polyimide or the like, and preferably has a thickness of $1\mu$ to 5 mm and more preferably $5\mu$ to 3 mm. The rubber layer may be made of a material to which migration of the adhesion-proofing agent is difficult, such as NBR, polychloroprene rubber, polyurethane elastomer, chlorosulfonated polyethylene, fluororubber, acrylic rubber, epichlorophdrin rubber, butyl rubber and halogenated butyl rubber, epoxidized natural rubber, or combinations of these materials or mixtures of these materials with other rubbers, and preferably has a thickness of 0.2 to 10 mm. These fiber, plastic and rubber layers can be combined as desired to form a layer for preventing migration of the adhesion-proofing agent, for example rubber coated fabric.

Particularly when the cover layer is formed by a rubber material selected from the group consisting of acrylonitrile-butadiene rubber, polyurethane elastomer, acrylic rubber, and combinations thereof, and mixtures thereof with at least one rubber selected from polybutadiene rubber, stylene butadiene rubber and natural rubber, the migration-proofing layer may preferably be formed by the following material.

(1) Material which has higher polarity and less affinity to the adhesion-proofing agent than material forming the cover rubber layer. For example, acrylonitrile-butadiene rubber having high acrylonitrile content (preferably more than 25% by weight), polychloroprene rubber, polyurethane elastomer, acrylic rubber, epichlorohydrin rubber, and combinations of these rubbers, and mixtures of these rubbers with other rubbers.

(2) Single layer or multilayer of knitted fabric or canvas of nylon or textile blend of nylon and polyester.

(3) Combinations of (1) and (2). For example, a combination of canvas with acrilonitrile-butadiene rubber.

When the cover layer is formed by a plastic material, the migration-proofing layer may preferably be formed by a plastic material which has less affinity to the adhesion-proofing agent than a plastic material forming the cover layer.

As shown in FIGS. 2 and 3, there may be provided a layer 5 containing a high level of the adhesion-proofing agent. The layer 5 serves to supply the adhesion-proofing agent for migration thereof to the cover layer 3, being effective to further improve the preventing effect of adhesion onto the cover layer 3, and after a certain service time, the depleted amount of the adhesion-proofing agent can be refilled.

The layer 5 may be made of any material so long as it can contain more adhesion-proofing agent than the cover layer 3. For example, the layer 5 is formed of a rubber or plastic layer with small holes 7 through which the adhesion-proofing agent depleted by bleeding can be refilled after a certain service time of the conveyor belt. In the embodiment in FIG. 2, the layer 5 and the cover layer 3 are integrally formed, while the layer 5 shown in FIG. 3 is formed of an open cell-type porous material such as polyurethane foam, polyvinylchloride foam and sponge, preferably containing 20 to 1000 parts by weight and more preferably 50 to 500 parts by weight of the adhesion-proofing agent per 100 parts by weight of the porous material.

The adhesion-proofing agent content of the layer 5 is desired to be in excess of 1.5 times and preferably in excess of 2 times that of the cover layer 5.

The conveyor belt of the present invention can be made by any desired method; the layers may be integrally vulcanized, or integrally molded, or they may be separately formed and then attached together by adhesives. In any case, it is required for the conveyor belt to contain the adhesion-proofing agent in the cover layer so as to be advantageously used for conveying a tacky material such as a tacky liquid, semi solid and solid of hydrocarbon groups, for example, bitumen and asphalt, or mixture of them with minerals or organic solids.

When the adhesion-proofing agent is consumed, the layer 5 can be refilled with additional adhesion-proofing agent, or the adhesion-proofing agent can be directly supplied to the belt surface by various ways such as application by a roller or brush, drip feed on the belt surface or passing the belt throuvgh an adhesion-proofing agent reservoir.

Now, Examples and Comparative Examples will be shown for better understanding of the present invention, but the invention is not limited to these examples.

Figure 4:
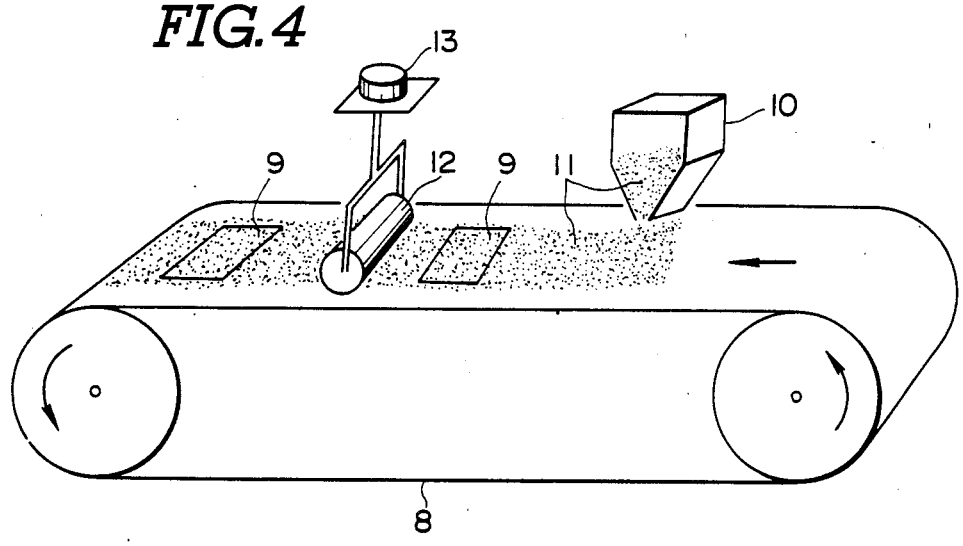
FIG. 4 is a schematic perspective view illustrating a dynamic adhesion evaluation apparatus.

An apparatus for evaluating adhesion of oil sand shown in FIG. 4 is used in the examples, and the evaulation method of adhesion which is important to know the performance of the conveyor belt material according to the present invention is as follows.

Conventionally, bond strength has been measured by a static adhesion evaluation method in which, after a tacky material is pressed against the surface of a nonadhesive material for a certain period of time, the strength (bond strength) required to peel off the tacky material at a constant speed is measured by a tack tester or the like. By the way, when it was examined in detail how oil sand begins to adhere to the belt surface, it was found that, in advance of adhesion of oil sand to the belt surface, the belt surface was first wetted by bitumen contained in oil sand and then adhesion of the oil sand itself began and was gradually accelerated.

In this way, with repeated contact with oil sand, the belt surface changes the adhesive capacity (surface state) with respect to oil sand at every time. Therefore, the conventional static evaluation method in which a tack tester is used to examine only the initial surface state of the material is hardly effective on evaluation of a practical oil sand coveyor belt which is to be kept in contact with oil sand for a long time, and it is useless to select the belt material according to the evaluation of the tack tester.

Under these circumstances, our inventors have studied an evaluation method by which the evaluation in the laboratory will coincide with the result in practical service conditions, that is, a dynamic adhesion evaluation method which can simulate adhesion of oil sand to the belt surface in the field, and provision of an apparartus for executing such a method has enabled quantitatively grasping the complex phenomen of adhesion of oil sand to the belt surface. Such a dynamic adhesion evaluation apparatus has made it possible to develop oil sand conveyor belt materials having non or low adhesive capacity.

Now, the apparatus will be described with reference to FIG. 4, in which there is provided an endless belt 8 having several cuts into which samples 9 are attached. Above the belt 8 is provided a hopper 10 in which oil sand 11 is held to be dropped therefrom steadily at a constant speed. As the belt 8 rotates, the samples carrying oil sand 11 are conveyed to a press roll 12 to be forcefully pressed against the belt 8. The press roll 12 is properly regulated by a weight 13. This process is repeated for 30 minutes, and the weight of the sample after the treatment is measured to be compared with that before the treatment to obtain the amount of adhered oil sand.

EXAMPLES 1 TO 4, COMPARATIVE EXAMPLE 1

Samples are obtained by preparing vulcanized sheets of 2 mm thick according to the compounding formulations shown in Table 1. Vulcanization is carried out at 150° C. for 30 minutes.

TABLE 1

|  | Examples | | | | (parts by weight) standard compound (Comparative Example) |
|---|---|---|---|---|---|
|  | 1 | 2 | 3 | 4 | |
| NBR *1 | 100 | — | — | 100 | 100 |
| Polyvinylchloride | — | 100 | — | — | — |
| Polyester | — | — | 100 | — | — |
| Carbon black (HAF) | 60 | — | — | 60 | 60 |
| Stearic acid | 1 | — | — | 1 | 1 |
| Zinc Oxide | 5 | — | — | 5 | 5 |
| Sulfur | 2 | — | — | 2 | 2 |
| Accelerator (DM) | 1.5 | — | — | 1.5 | 1.5 |
| Butyl Oleate | 60 | 20 | — | — | — |
| Butyl stearate | — | — | 30 | — | — |
| n-Octyl oleate | — | — | — | 60 | — |

*1 NBR: acrylonitrile content is about 20%

Table 2 shows characteristic values of the two kinds of adhesion-proofing agents used in Examples 1 to 3.

TABLE 2

|  | Butyl oleate | Butyl stearate |
|---|---|---|
| SP value | 9.0 | 7.5 |
| Bond strength ratio | 0.16 | 0.20 |
| Bleeding speed (mg/cm$^2$) | 0.10 | 0.14 |
| Boiling point (°C.) | 190 to 230/6.5 mmHg | 220 to 225/25 mmHg |

In Table 2, the bond strength ratio means the ratio of the bond strength of a solution prepared by mixing 1 part by weight of bitumen and 1 part by weight of the adhesion-proofing agent to that of bitumen itself.

The bleeding speed is obtained as follows:

(1) Prepare a 5×5 cm sheet sample of 2 mm thick by mixing the standard compound (NBR/carbon group compound of Comparison) with 30 parts by weight of butyl oleate or butyl stearate per 100 parts by weight of NBR.

(2) Wipe the surface of the sample with cotton containing acetone and then leave the sample in a desiccator at 20° C. for 24 hours.

(3) Wipe the (one) surface of the sample left in the desiccator with cotton containing acetone, and soak the cotton in acetone.

(4) Measure by gas chromatography the acetone liquid obtained at the above step (3), and determine the amount of the adhesion-proofing agent bled on the 25 cm$^2$ sample surface while it has left at 20° C. for 24 hours.

Then, the vulcanized sheets prepared according to Table 1 were attached in the dynamic adhesion evaluation apparatus shown in FIG. 4 to measure the amount of adhesion of oil sand. Measurement was executed at a belt speed of 40 m/min., with oil sand dropped at a speed of 100 g/min., a weight of 3 kg applied by the press roll. The oil sand was directly sent from Canada.

The amount of adhesion in the examples were indicated by means of the relative adhesion (relative value when the amount of adhesion in the standard compound is 100), and a smaller value means a smaller amount of adhesion.

The results of the measurement are given in Table 3.

TABLE 3

|  | Examples | | | | Standard compound (Comparative Example) |
|---|---|---|---|---|---|
|  | 1 | 2 | 3 | 4 | |
| Relative adhesion | 0.1 | 1.0 | 0.5 | 0.1 | 100 |

The results in Table 3 tell us that the samples containing adhesion-proofing agents were effective to produce drastic reduction of adhesion of oil sand.

EXAMPLE 5, COMPARATIVE EXAMPLE 2

A cover rubber layer (2 mm thick) and a core rubber layer (2 mm thick) which, respectively, have the formulations shown in the following and a migration-proofing layer made of nylon canvas were laminated to form a sample as shown in FIG. 1; the amount of migration of the adhesion-proofing agent and the amount of adhesion of oil sand were measured as to this sample by the same way as that for the above Examples 1 to 4.

Figure 5:
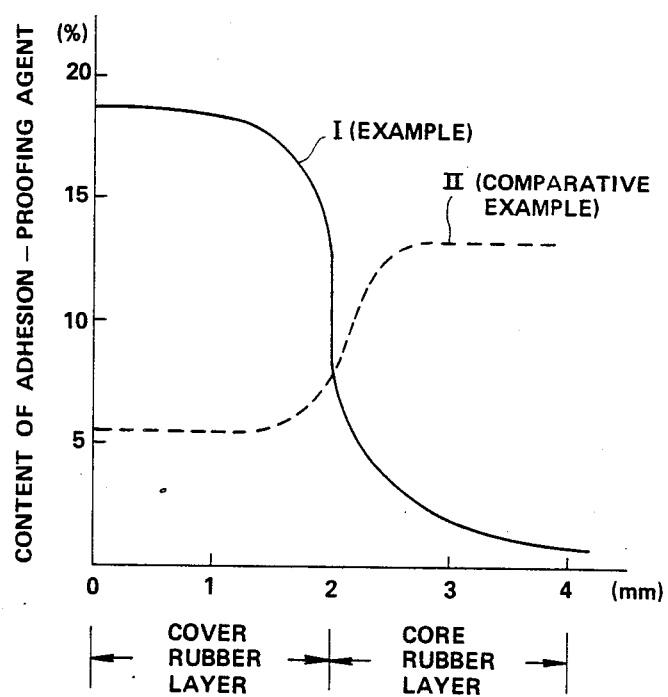
FIG. 5 shows a graph illustrating the degree of migration of the adhesion-proofing agent to the core layer.

The results are given in FIG. 5 and Table 4.

| Cover rubber formulation | |
|---|---|
| NBR (acrylonitrile content 20%) | 100 parts by weight |
| Carbon black (HAF) | 60 |
| Butyl oleate | 40 |
| Stearic acid | 1 |
| ZnO | 5 |
| Sulfur | 3 |
| Vulcanization accelerator | 2.5 |
| Core rubber formulation | |
| Natural rubber | 40 parts by weight |
| Styrene-butadiene rubber | 60 |
| Carbon black (GPF) | 40 |
| Stearic acid | 1 |
| ZnO | 5 parts by weight |
| Sulfur | 2.2 |
| Vulcanization accelerator | 1.5 |

Results

The cover rubber layer and core rubber layer were attached together by vulcanization with a migration-proofing layer (1 mm thick nylon canvas) interposed between the layers, and after 6 months, adhesion-proofing capacity was measured as to each layer. As shown by a solid line I in FIG. 5, migration of the adhesion-proofing agent (butyl oleate) contained in the cover rubber layer was hardly detected in the core rubber, while in case no migration-proofing layer was provided (Comparative Example 2), the adhesion-proofing agent content of the core rubber was larger than that of the cover rubber, and such a belt caused extreme adhesion of oil sand.

TABLE 4

|  | Example 5 | Comparative Example 2 |
|---|---|---|
| Presence of migration-proofing layer | Yes | No |
| Relative adhesion | 2 | 100 |

EXAMPLE 6-8, COMPARATIVE EXAMPLE 3

A cover rubber layer (12 mm thick) and a core rubber layer (9 mm thick) which, respectively, have the formulations in the following and a migration-proofing layer made of a sheet of canvas or a combination of two sheets of canvas with a rubber layer were laminated to form a sample as shown in FIGS. 6 to 9.

| Cover rubber formulation | |
|---|---|
| NBR (acrylonitrile content 20%) | 100 parts by weight |
| Carbon black (HAF) | 65 |
| n-Octyl oleate | 50 |
| Stearic acid | 1 |
| ZnO | 5 |
| Sulfur | 3 |
| Vulcanization accelerator | 2.5 |
| Core rubber formulation | |
| Natural rubber | 40 parts by weight |
| Styrene-butadiene rubber | 60 |
| Carbon black (GPF) | 40 |
| Stearic acid | 1 |
| ZnO | 5 |
| Sulfur | 2.2 |
| Vulcanization accelerator | 1.5 |

Figure 6:
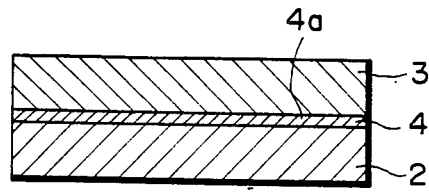
FIGS. 6 to 9 show cross-sectional views of samples used for evaluating the degree of migration of the adhesion-proofing agent to the core layer, respectively.

The sample III shown in FIG. 6 has the cover layer 3 and the core layer 2 with a migration-proofing layer 4 made of a sheet of canvas 4a (1 mm thick) interposed between the layers 2 and 3.

Figure 7:
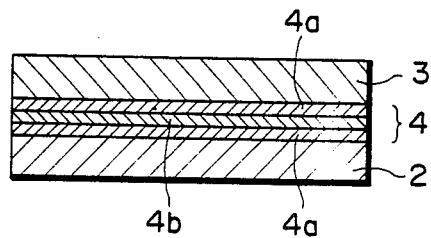

The sample IV shown in FIG. 7 has the cover layer 3 and the core layer 2 with a migration-proofing layer 4 interposed therebetween and consisting of two sheets of canvas 4a,4a (1 mm thick, respectively) and a vulcanized NR/SBR blend rubber layer 4b (1 mm thick) which has the same formulation as that of the core rubber layer 2 and is interposed between the canvases 4a,4a.

The sample V shown in FIG. 8 has the cover layer 3 and the core layer 2 with a migration-proofing layer 4 interposed therebetween and consisting of two sheets of canvas 4a,4a (1 mm thick, respectively) and a vulcanized rubber layer 4c (1 mm thick) which has the formulation in the following and is interposed between the canvases 4a,4a.

| Rubber formulation: | |
|---|---|
| NBR (Acrylonitrile content 35%) | 100 parts by weight |
| Carbon black (GPF) | 50 |
| Softening agent | 10 |
| Stearic acid | 1 |
| ZnO | 1 |
| Sulfur | 1.5 |
| Vulcanization accelerator | 1.5 |

Figure 8:
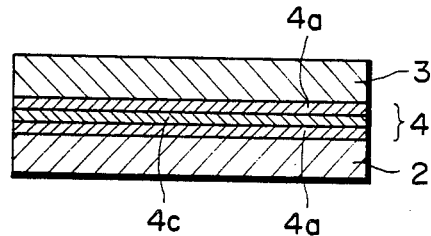

The canvas used for the samples of FIGS. 6 to 8 is made of nylon 6-6 warp yarn (count number: 72 ends of two ply (1260 denier) twisted yarn/5 cm) and polyester weft yarn (count number: 20 picks of two ply (1000 denier) twisted yarn/5 cm).

Figure 9:
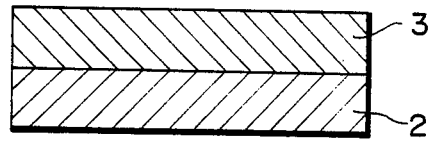

The sample VI of FIG. 9 which is shown as a comparative example has the cover layer 3 and the core layer 2 with no migration-proofing layer.

The samples were left at 100° C. for a week and thereafter adhesion-proofing capacity was measured as to each layer of the samples by the same procedure as in Example 5.

The results are shown in FIG. 10. In FIG. 10, MPL indicates the migration-proofing layer.

As shown by lines III to V (the samples III to V each having a migration-proofing layer) in FIG. 10, migration of the adhesion-proofing agent (n-octyl oleate) contained in the cover rubber layer to the core rubber layer was effectively prevented. On the other hand, considerable migration of the adhesion-proofing agent in the cover rubber layer to the core rubber layer occurred in the sample VI (Comparative Example) having no migration-proofing layer.

What is claimed is:

1. A conveyor belt suitable for conveying tacky materials, comprising:
   a cover layer having at least one layer containing an ester of an aliphatic carboxylic acid and an aliphatic alcohol as an adhesion-proofing agent;
   a core layer; and
   a migration-proofing layer interposed between said cover layer and said core layer for preventing migration of said adhesion-proofing agent to said core layer so that said adhesion-proofing agent prevents adhesion of said tacky materials to said cover layer.

2. The conveyor belt as defined in claim 1 wherein said migration-proofing layer is made of a fiber layer, a plastic layer or a rubber layer, or the combination thereof.

3. The conveyor belt as defined in claim 2, wherein said migration-proofing layer is formed by material having a higher polarity than the material forming said cover layer.

4. The conveyor belt as defined in claim 2, wherein said migration-proofing layer is formed by a combination of canvas with acrylonitrile-butadiene rubber.

5. The conveyor belt as defined in claim 1 wherein a layer containing a high level of said adhesion-proofing agent is provided between an outermost cover layer and said migration-proofing layer.

6. The conveyor belt as defined in claim 5, wherein said outermost cover layer is formed of polyurethane elastomer containing the adhesion-proofing agent.

7. The conveyor belt as defined in claim 1 wherein the adhesion-proofing agent is one which can be bled on the surface of the cover layer and mixed with oil sand to reduce considerably the adhesion or cohesive force of bitumen in the oil sand.

8. The conveyor belt as defined in claim 1, wherein said core layer is made of rubber with a reinforcing material embedded therein.

9. The conveyor belt as defined in claim 1, wherein the cover layer is made of acrylonitrile-butadiene rubber, polyurethane elastomer or acrylic rubber or one or more of these rubbers with polybutadiene rubber, styrene butadiene rubber or natural rubber.

10. The conveyor belt as defined in claim 1, wherein the ester is blended in an amount of 1 to 250 parts by weight per 100 parts by weight of the rubber or plastic material of the cover layer.

11. The conveyor belt as defined in claim 8, wherein said rubber is selected from the group consisting of natural rubber, isoprene rubber, styrene-butadiene rubber, polybutadiene rubber, polyisobutylene rubber, polychloroprene rubber, butyl rubber, acrylonitrile-butadiene rubber, and epoxidized natural rubber, or blends thereof.

12. The conveyor belt as defined in claim 8, wherein said reinforcing material is metal cord such as steel having the surface thereof optionally plated with a member selected from the group consisting of brass, bronze and zinc.

13. The conveyor belt as defined in claim 1, wherein said conveyor belt is made of a plastic material selected form the group consisting of methacrylic resin, ABS resin, polyvinyl chloride, polystyrene, polyvinylidene chloride, polyamide, cellulosic resin, polyethylene, polypropylene, modified polyolefin, chlorinated polyolefin, ethylene-vinyl acetate copolymer, and ethyleneacrylate copolymer.

14. The conveyor belt as defined in claim 1, wherein said adhesion-proofing agent has a solubility parameter value between 7.0 and 9.5.

15. The conveyor belt as defined in claim 1, wherein said aliphatic carboxylic acid is monobasic carboxylic acid with 10-30 carbon molecules or dibasic acid with 6-10 carbon molecules.

16. The conveyor belt as defined in claim 15, wherein said monobasic acid is a member selected from the group consisting of capric acid, lauric acid, myristic acid, palmitic acid, stearic acid, undecylenic acid, oleic acid, linolic acid, ricinolic acid, lauroleic acid, elaidic acid, erucic acidd, linoelaidic acid, eleostearic acid, myristoleic acid and linolenic acid.

17. The conveyor belt as defined in claim 15, wherein said dibasic acid is a member selected from the group consisting of adipic acid, sebacic acid, and azelaic acid.

18. The conveyor belt as defined in claim 1, wherein said aliphatic alcohol is a saturated or unsaturated monohydric alcohol with 1-10 carbon atoms.

19. A conveyor belt suitable for conveying tacky materials, comprising:
a cover layer made of rubber or plastic material and having at least one layer containing an ester of an aliphatic carboxylic acid and an aliphatic alcohol as an adhesion-proofing agent;
a core layer made of rubber with reinforcing material embedded therein; and
a migration-proofing layer, interposed between said cover layer and said core layer, and made of fiber, plastic, or rubber material or the combination thereof, having a higher polarity than the material forming said cover layer for preventing migration of said adhesion-proofing agent to said core layer so that said adhesion-proofing agent prevents adhesion of tack materials to said cover layer.

20. The conveyor belt as defined in claim 19, wherein said migration-proofing layer is formed by a combination of canvas with acrylonitrile-butadiene rubber.

21. The conveyor belt as defined in claim 19, wherein a layer containing a high level of said adhesion-proofing agent is provided between an outermost cover layer and said migration-proofing layer.

22. The conveyor belt as defined in claim 20, wherein said outermost cover layer is formed of polyurethane elastomer containing the adhesion-proofing agent.

23. The conveyor belt as defined in claim 19, wherein the cover layer is made of acrylonitrile-butadiene rubber, polyurethane elastomer or acrylic rubber or one or more of these rubbers with polybutadiene rubber, styrene butadiene rubber or natural rubber.

24. The conveyor belt as defined in claim 19, wherein the ester is blended in an amount of 1 to 250 parts by weight per 100 parts by weight of the rubber or plastic material of the cover layer.

25. The conveyor belt as defined in claim 19, wherein said aliphatic carboxylic acid is monobasic carboxylic acid with 10-30 carbon molecules or dibasic acid with 6-10 carbon molecules.

26. The conveyor belt as defined in claim 25, wherein said monobasic acid is a member selected from the group consisting of capric acid, lauric acid, myristic acid, palmitic acid, stearic acid, undecylenic acid, oleic acid, linolic acid, ricinolic acid, lauroleic acid, elaidic acid, erucic acid, linoelaidic acid, eleostearic acid, myristoleic acid and linolenic acid.

27. The conveyor belt as defined in claim 24, wherein said dibasic acid is a member selected from the group consisting of adipic acid, sebacic acid, and azelaic acid.

28. The conveyor belt as defined in claim 19, wherein said aliphatic alcohol is a saturated or unsaturated monohydric alcohol with 1-10 carbon atoms.

* * * * *